US012576759B2

(12) United States Patent
Ohira

(10) Patent No.: US 12,576,759 B2
(45) Date of Patent: Mar. 17, 2026

(54) AIR CONDITIONING FLOW CHANNEL UNIT FOR SEAT

(71) Applicant: TOYOTA BOSHOKU KABUSHIKI KAISHA, Aichi-ken (JP)

(72) Inventor: Satoru Ohira, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 134 days.

(21) Appl. No.: 18/775,351

(22) Filed: Jul. 17, 2024

(65) Prior Publication Data

US 2025/0050793 A1 Feb. 13, 2025

(30) Foreign Application Priority Data

Aug. 8, 2023 (JP) ................................. 2023-129424

(51) Int. Cl.
*B60N 2/56* (2006.01)
(52) U.S. Cl.
CPC ......... *B60N 2/5657* (2013.01); *B60N 2/5642* (2013.01)

(58) Field of Classification Search
CPC ............................ B60N 2/5657; B60N 2/5642
See application file for complete search history.

(56) References Cited

FOREIGN PATENT DOCUMENTS

JP 2018-144591 9/2018

*Primary Examiner* — Adam C Ortiz
(74) *Attorney, Agent, or Firm* — GREENBLUM & BERNSTEIN, P.L.C.

(57) ABSTRACT

An air conditioning flow channel unit for seat has a covering member, a front attaching member, a fixing portion, and a back attaching member. The covering member has a covering portion and a connecting port. The connecting port is formed in a part of the covering portion to which a blower is connected from the backside of the seat. The front attaching member has a front abutting portion. The fixing portion fixes the front attaching member to the covering member. The back attaching member has a blower attaching portion. The back attaching member is provided on the backside of the seat of the covering member. The front attaching member has a protruding portion. The back attaching member has a fitting portion. The back attaching member is attached to the front attaching member by fitting of the fitting portion.

18 Claims, 15 Drawing Sheets

AIR CONDITIONING FLOW CHANNEL UNIT FOR SEAT

CROSS-REFERENCE TO RELATED APPLICATIONS

This application claims priority to Japanese patent application serial number 2023-129424, filed Aug. 8, 2023, the content of which is incorporated herein by reference in its entirety for all purposes.

BACKGROUND

The present disclosure relates to an air conditioning flow channel unit for seat.

For example, a prior art discloses an air conditioning flow channel unit for seat. In this disclosure, the air conditioning flow channel unit for seat has a covering member and a blower. The covering member covers a back surface of a cushion pad so as to cover a concave ventilation channel formed on the back surface of the cushion pad. The blower absorbs air from the ventilation channel through a connecting port formed on the covering member. The blower desorbs the absorbed air in the ventilation channel toward the lower of the cushion pad. Thereby efficiently ventilating the inside of the pad.

The above-mentioned blower is assembled and supported by a cushion frame. Such a blower is not mechanically joined to the connecting port of the covering member but is simply overlapped in arrangement. The arrangement relationship between the blower and the connecting port is shifted when the cushion pad is shifted against the cushion frame due to the load of the seated person. There is a concern that the absorb/desorb performance of the blower may deteriorate. Therefore, there is a need for an air conditioning flow channel unit for seat in which the blower does not easily shift position with respect to the covering member.

SUMMARY

One aspect of the present disclosure is an air conditioning flow channel unit for seat having a covering member, a front attaching member, a fixing portion, and a back attaching member. The covering member is surface-shaped. The covering member has a covering portion and a connecting port. The covering portion is placed over a seat pad so as to form a channel wall of a concave ventilation channel formed in the seat pad. The connecting port is formed in a part of the covering portion to which a blower is connected from the backside of the seat. The front attaching member has a front abutting portion that is abutted on the covering member from the frontside of the seat. The fixing portion fixes the front attaching member to the covering member. The back attaching member has a blower attaching portion to which the blower is attached. The back attaching member is provided on the backside of the seat of the covering member. One of the front attaching member and the back attaching member has a protruding portion. The protruding portion protrudes through the connecting portion toward the other. The other of the front attaching member and the back attaching member has a fitting portion. The fitting portion is fitted to the protruding portion by relative rotation around the connecting port along the surface of the covering member. The back attaching member is attached to the front attaching member by fitting of the fitting portion.

According to the above aspect, the blower can be assembled to the covering member provided with the connecting port via the front attaching member and the back attaching member. This prevents misalignment between the blower and the covering member.

DETAILED DESCRIPTION

Referring to FIGS. 1-16, embodiments for carrying out the present disclosure will be described. In the following description, when indicating each direction such as forward, backward, upper, lower, right, and left, it shall be assumed that the respective directions indicated in each figure are meant.

Figure 1:
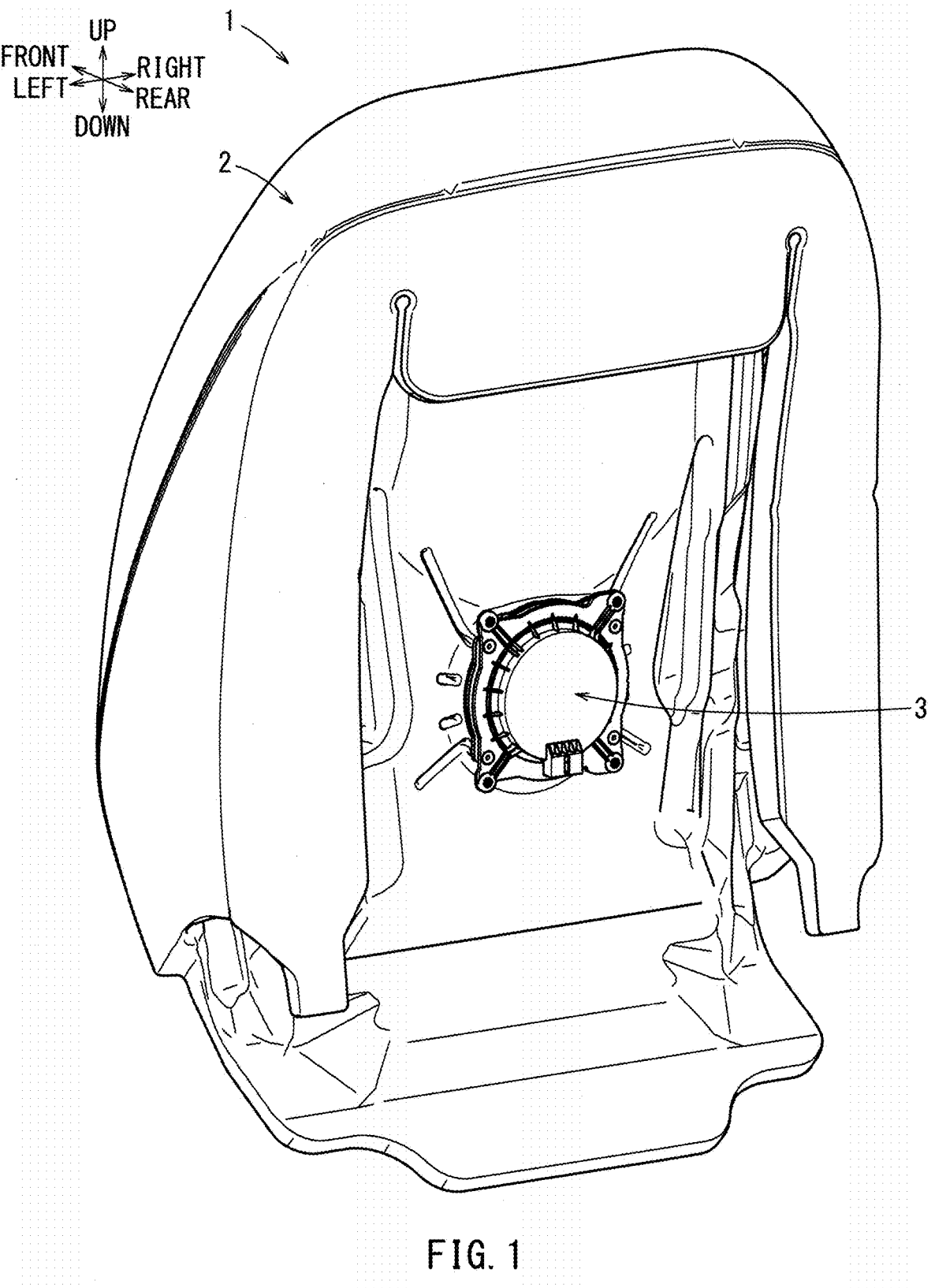
FIG. 1 is a perspective view of a seat back to which an air-conditioning flow channel unit according to an embodiment is applied.

First, an air conditioning flow channel unit for seat (an air conditioning flow channel unit 3) in accordance with an embodiment of the present disclosure will be described. As shown in FIG. 1, the air conditioning flow channel unit 3 is applied to a seat back 1 of a vehicle seat. The seat back 1 has a back frame (not shown) that forms the framework, a back pad 2 that is assembled to the back frame from the front and forms a cushion material, and a back cover (not shown) that covers the back pad 2 from the front. The air conditioning flow channel unit 3 is attached to the back of the back pad 2.

Figure 2:
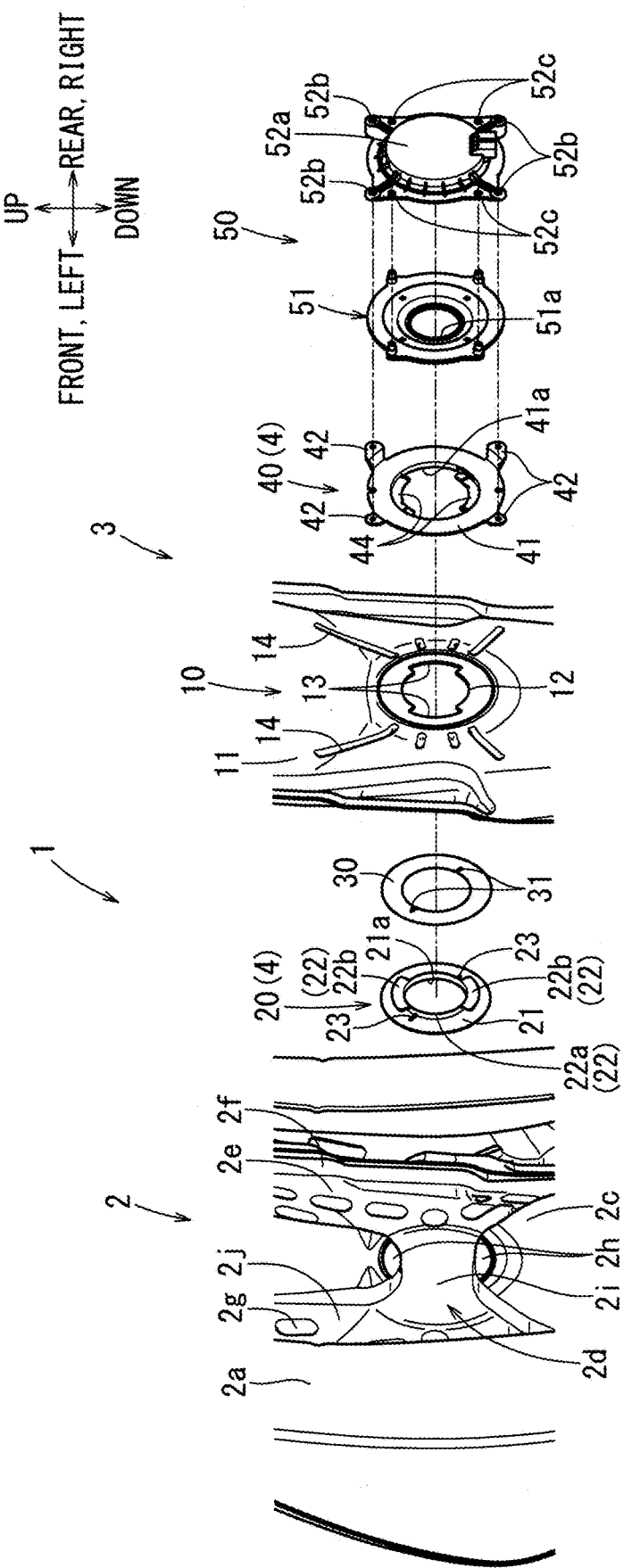
FIG. 2 is an exploded view of the seat back.

As shown i7n FIG. 2, the air conditioning flow channel unit 3 has a covering member 10 and a blower case 50. The covering member 10 is sheet-shaped and is assembled so as to cover the back of the back pad 2. The blower case 50 is attached to the covering member 10 from the backside of the seat. The air conditioning flow channel unit 3 has an attaching member 4 for attaching the blower case 50 to the covering member 10. A blower (not shown) is housed inside the blower case 50. The blower operates to actively ventilate the interior of the back pad 2. This allows the air conditioning flow channel unit 3 to improve the comfort of the seat back 1.

As shown in FIG. 2, the back pad 2 has a pad body 2a and a ventilation channel 2d. The pad body 2a elastically supports the back of a seated person. The ventilation channel 2d is concave-shaped and extend along a pad back surface 2c of the pad body 2a. The back pad 2 has a plurality of ventilation holes 2g. The ventilation holes 2g penetrate from various locations on a bottom surface 2e of the ventilation channel 2d to a pad surface 2b (see FIG. 3). The pad body 2a is made of molded polyurethane foam. The ventilation channel 2d opens toward the backside of the seat. The opening of the ventilation channel 2d is closed by the covering member 10. The ventilation channel 2d is connected to the blower via a connecting port 12 formed in the covering member 10. Here, the back pad 2 corresponds to the "seat pad" of the present disclosure.

The air permeability of the interior of the back pad 2 is enhanced by the ventilation channel 2d and each ventilation hole 2g. This improves the efficiency of seat air conditioning by the blower. Air is absorbed into each ventilation hole 2g from the pad surface 2b side as the blower sends air toward the rear of the back pad 2. The air absorbed into each ventilation hole 2g is desorbed from the connecting port 12 to the rear of the back pad 2 via the ventilation channel 2d. In this way, the air conditioning by the blower is implemented. The blower may operate to send air from the pad back surface 2c toward the pad surface 2b.

Figure 3:
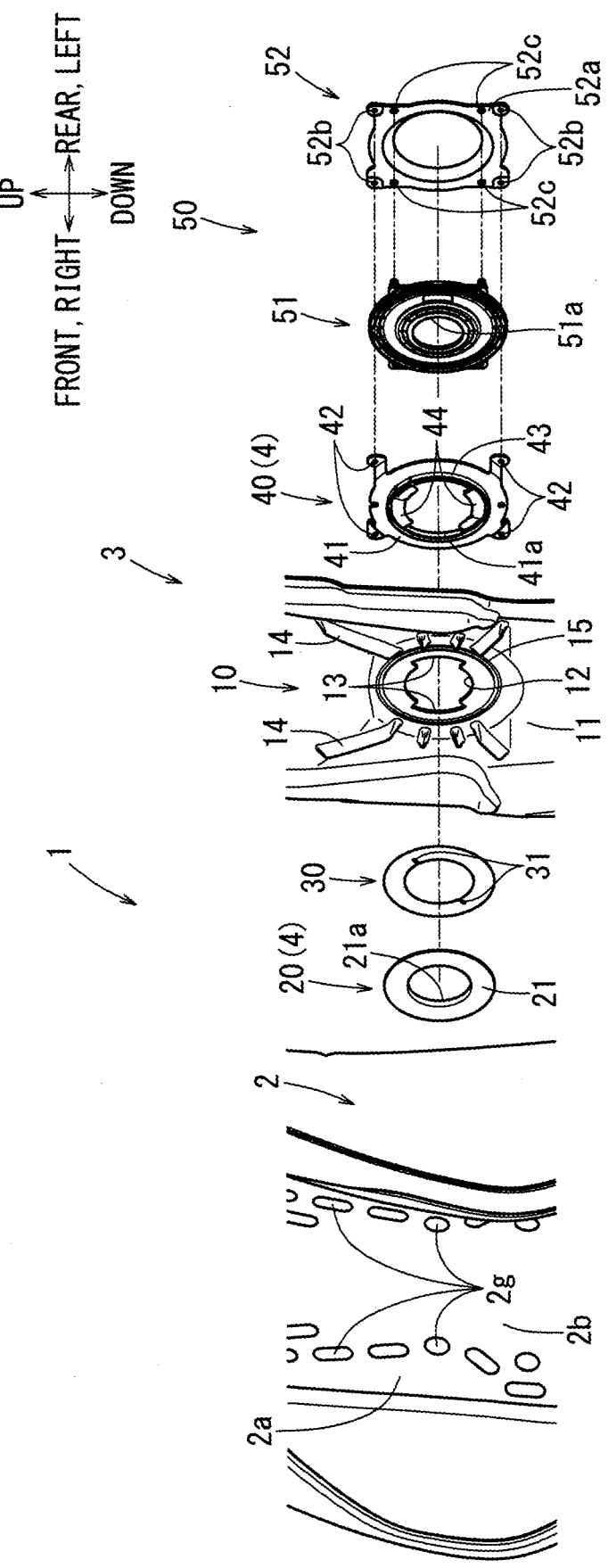
FIG. 3 is an exploded view of the seat back of FIG. 2 from front.

As shown in FIGS. 2 and 3, the attaching member 4 of the air conditioning flow channel unit 3 has a front attaching member 20 and a back attaching member 40. The front attaching member 20 is assembled to the covering member 10 from the frontside of the seat. The back attaching member 40 is assembled to the front attaching member 20 from the backside of the seat sandwiching the cover member 10. As shown in FIGS. 8 and 9, the back attaching member 40 has a blower attaching portion 42 to which the blower case 50 can be attached. The blower case 50 is attached to the blower attaching portion 42 from the backside of the seat. As a result, the back attaching member 40 and the blower case 50 are assembled integrally with each other.

Figure 8:
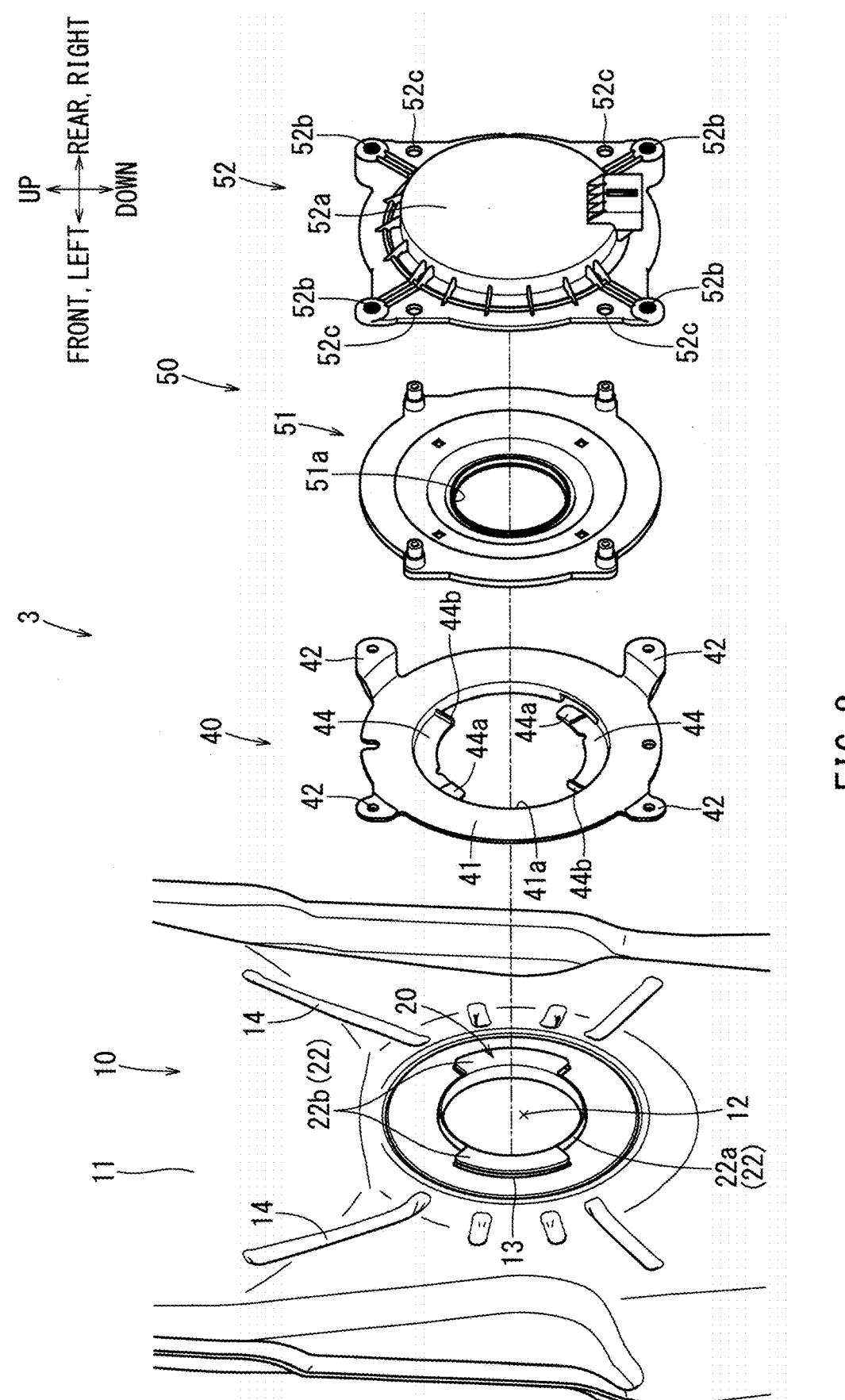
FIG. 8 is a perspective view of the air conditioning flow channel unit showing the state in which a hooking portion is passed through a covering member.
Figure 9:
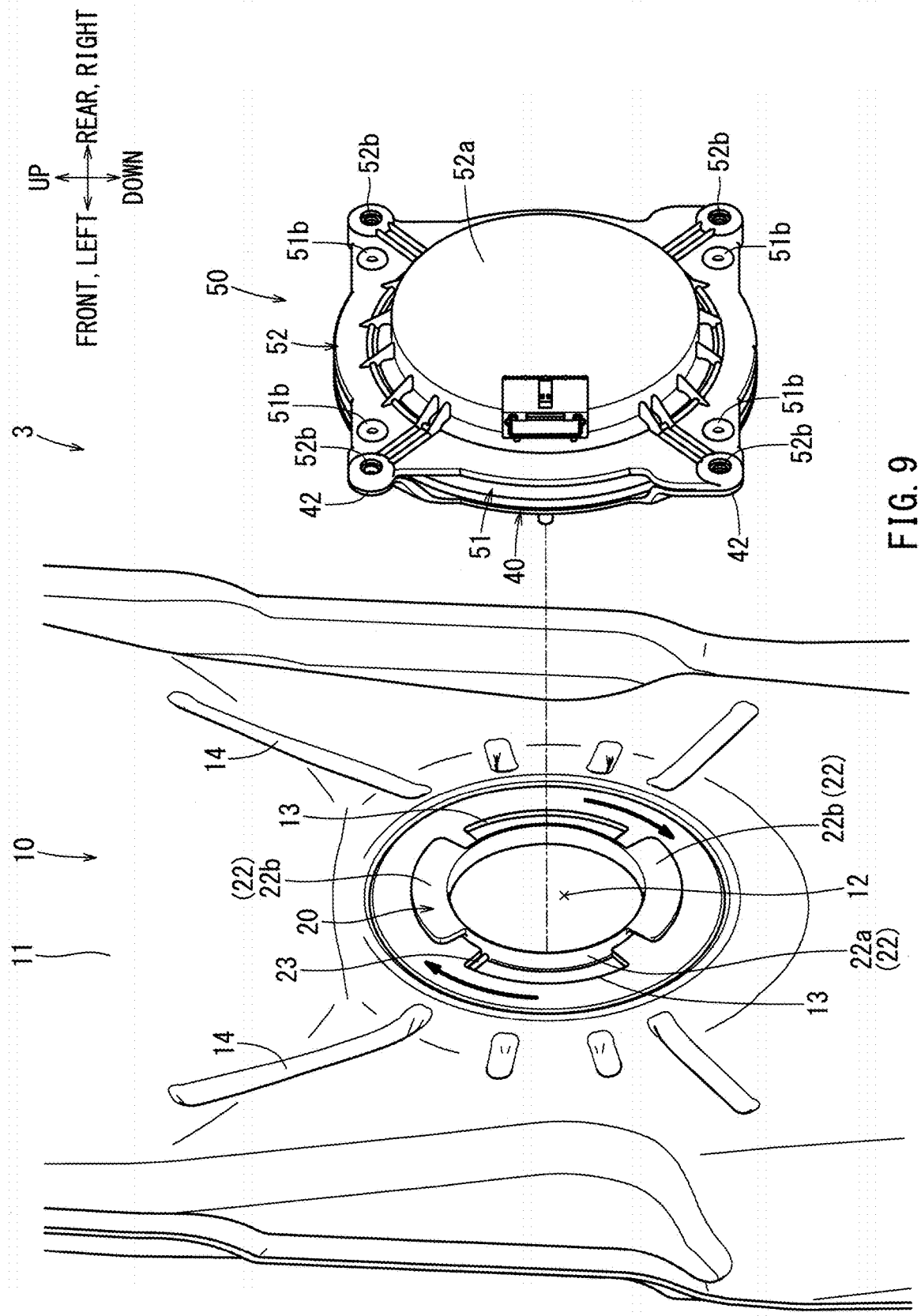
FIG. 9 is a perspective view of the air conditioning flow channel unit showing the state in which a front attaching member is rotated clockwise in the rear view from the air conditioning flow channel unit of FIG. 8.
Figure 10:
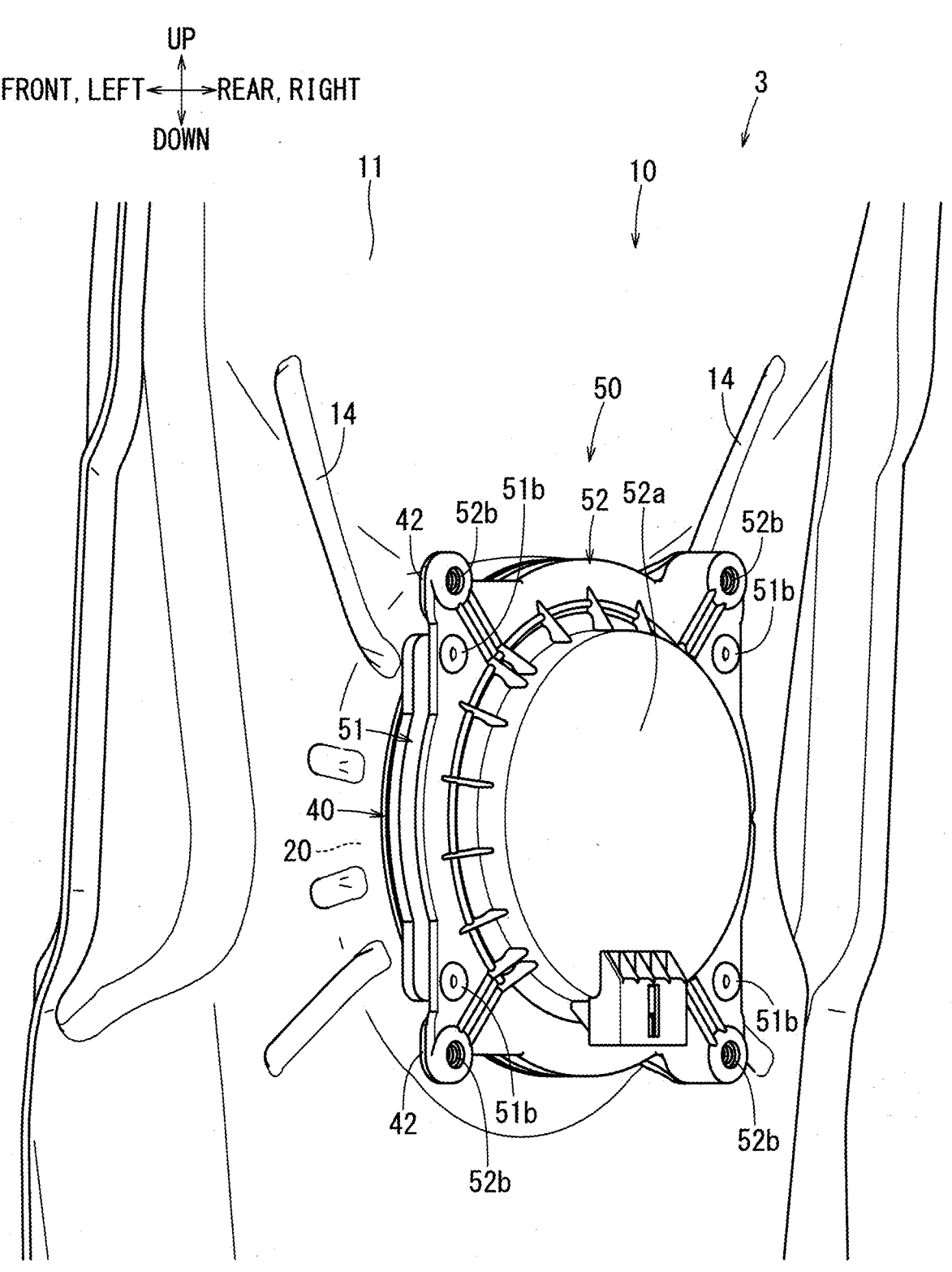
FIG. 10 is a perspective view showing the state in which the air conditioning flow channel unit is assembled.

As shown in FIGS. 8 and 9, the front attaching member 20 has a protruding portion (a hooking portion 22). When the front attaching member 20 is assembled to the cover member 10, the protruding portion (the hooking portion 22) protrudes through the connecting port 12 of the covering member 10 toward the backside of the seat. The back attaching member 40 is attached to the hooking portion 22 from the backside of the seat. Specifically, a fitting portion 44 of the back attaching member 40 is rotated around the connecting port 12 while applying it to the covering member 10 from the backside of the seat. Thereby, the fitting portion 44 is hooked onto the hooking portion 22. As shown in FIG. 10, the back attaching member 40 and the blower case 50 are attached to the covering member 10 via the front attaching member 20. In this way, it is possible to prevent the position of the blower with respect to the covering member 10 from shifting.

Figure 5:
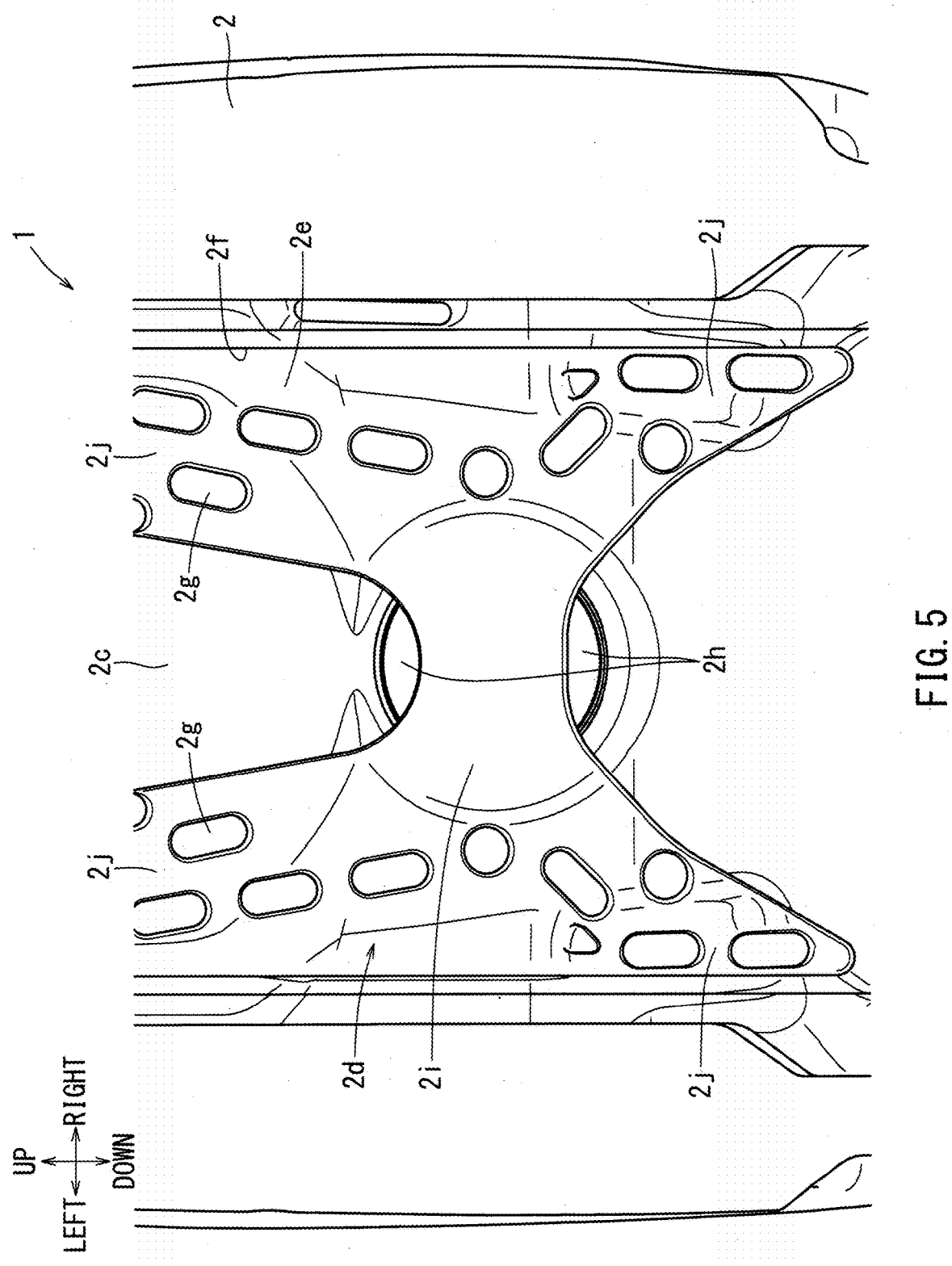
FIG. 5 is a rear view of the seat back in which the air conditioning flow channel unit is removed.

Each of the above-mentioned configurations of the seat back 1 will now be described in detail. As shown in FIG. 5, the ventilation channel 2d of the back pad 2 has the bottom surface 2e and a side surface 2f that rises in a vertical wall shape from the periphery of the bottom surface 2e. The ventilation channel 2d also have a channel base 2i and four channel tips 2j. The channel base 2i is formed at the center of the pad back surface 2c in the height direction. The channel tips 2j extend from the channel base 2i to branch off from each other in the height direction. The ventilation channels 2d are formed in an abbreviated H-shape in the rear view. Each channel tip 2j is provided with relatively more ventilation holes 2g than the channel base 2i. This allows a large amount of air to easily flow into each channel tip 2j.

Figure 4:
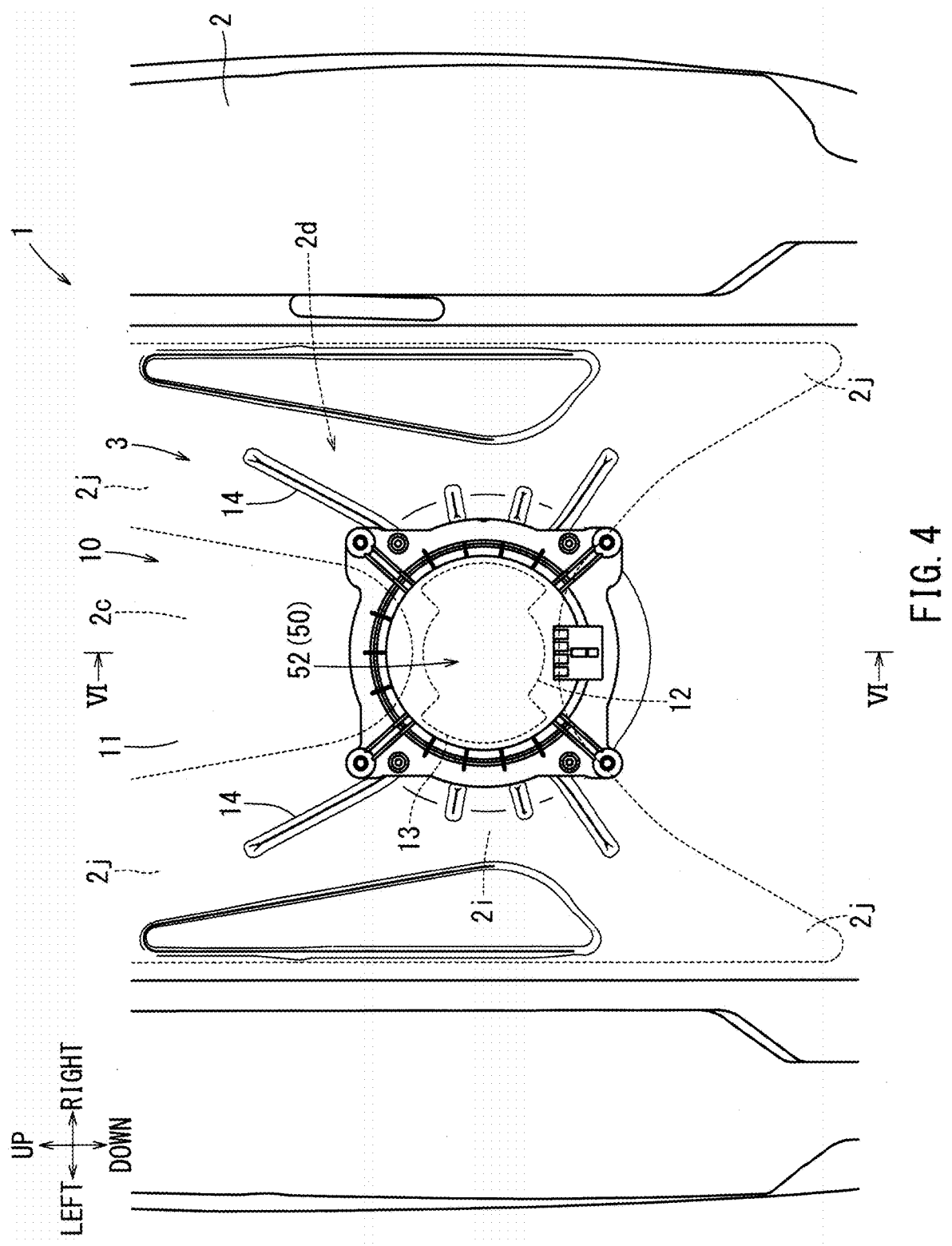
FIG. 4 is a rear view of the seat back.

Each channel tip 2j is tapered with the respective channel width gradually narrowing toward the tip in the extending direction. As shown in FIG. 4, the blower is provided so that the channel base 2i of the ventilation channel 2d is covered from the backside of the seat. As shown in FIG. 5, the air flowing into the ventilation channel 2d from each ventilation hole 2g is absorbed into the blower so that it flows from each channel tip 2j toward the channel base 2i. Because each channel tip 2j is tapered, the flow width of the ventilation channel 2d gradually increases when viewed along the direction of the air flow. Thereby, the flow velocity of the flowing air is reduced. The reduced flow velocity allows the blower to properly absorb the incoming air. With the above configuration, the ventilation channel 2d allows the blower to absorb a sufficient amount of air and desorb it efficiently.

As shown in FIG. 2, the covering member 10 has a covering portion 11, the connecting port 12, and an enlarging hole 13. The covering portion 11 extends along the pad back surface 2c. The connecting port 12 opens in a circular shape from the center of the covering portion 11. The enlarging hole 13 is formed in an enlarged diameter from a portion of the connecting port 12. The covering portion 11 covers the channel space of the ventilation channel 2d from the backside of the seat. The covering member 11 is overlapped by its periphery on the pad back surface 2c and bonded by an adhesive such as a hot melt. This keeps the covering member 10 covered on the pad back surface 2c. The enlarging hole 13 are formed to extend in a fan shape from the connecting port 12 to both sides of the seat in the seat width direction, respectively.

Figure 6:
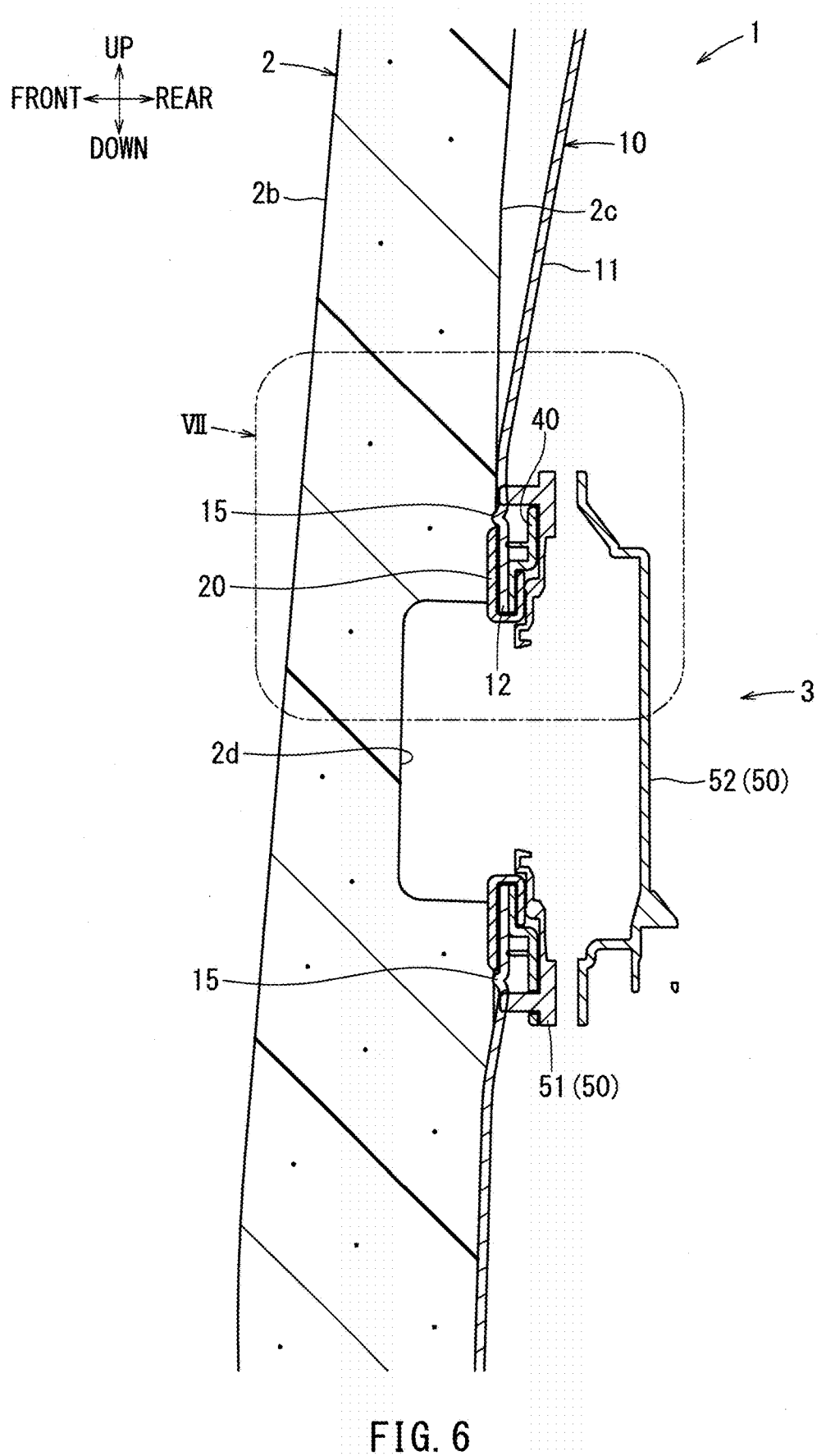
FIG. 6 is a cross-sectional view taken along a line VI-VI in FIG. 4.
Figure 7:
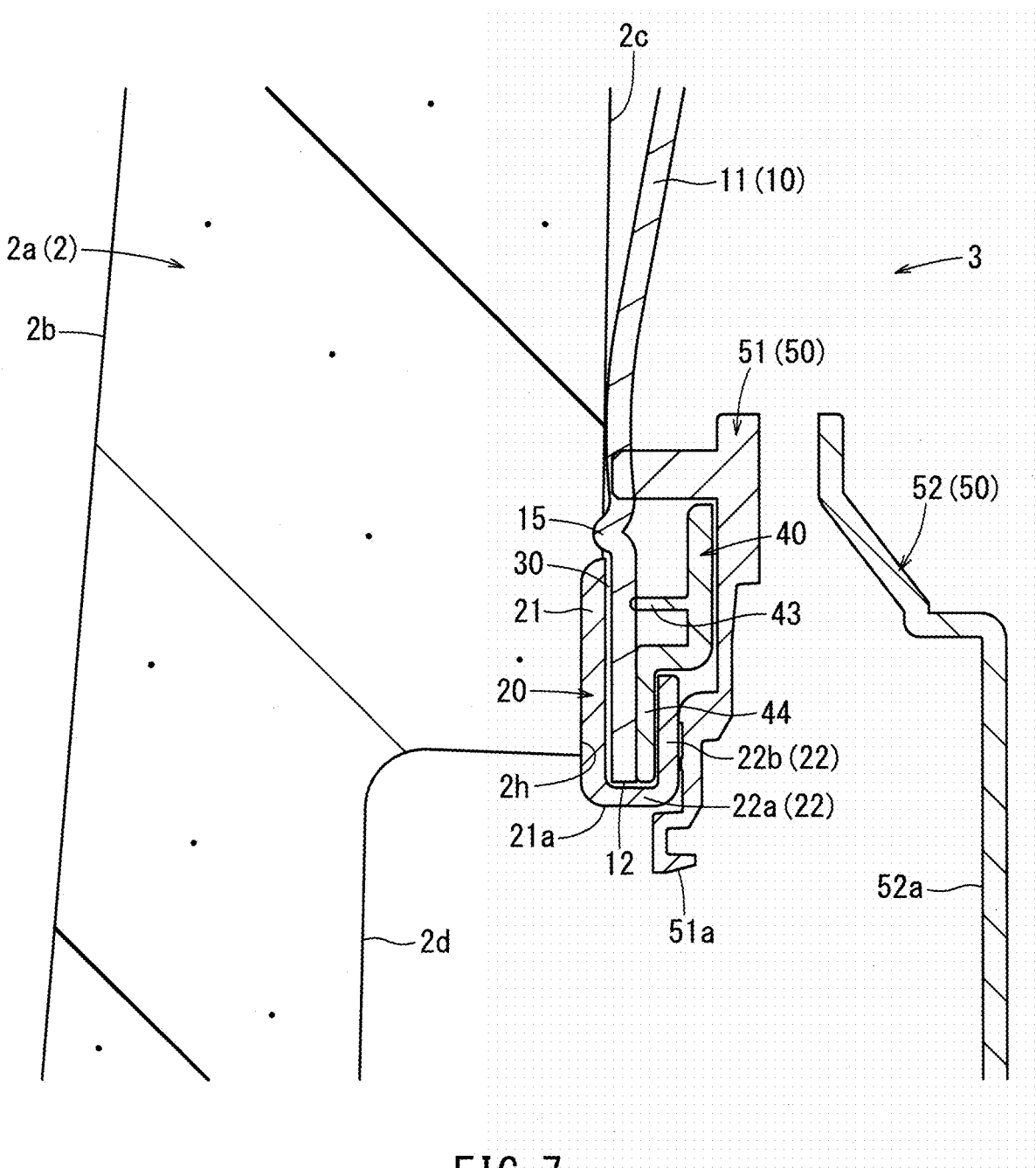
FIG. 7 is an enlarged view of a section VII in FIG. 6.

As shown in FIG. 3, the covering member 10 has an annular convex portion 15 and a plurality of linear ribs 14. The annular convex portion 15 protrudes toward the frontside of the seat so as to surround the connecting port 12. The ribs 14 project from the circumference of the annular convex portion 15. Each rib 14 is formed to radially extend from the connecting port 12 along the in-plane direction of the covering portion 11. Each rib 14 increases the rigidity of the covering portion 11. As shown in FIGS. 6 and 7, the annular convex portion 15 is abutted on the pad back surface 2c when the covering member 10 is attached to the pad back surface 2c. This makes it difficult to generate a gap between the covering member 10 and the pad back surface 2c around the connecting port 12. As a result, air is less likely to leak from around the connecting port 12, and a decrease in the air absorb performance of the blower can be suppressed.

As shown in FIG. 2, the front attaching member 20 has a front ring plate 21 and a front ring hole 21a. The front ring plate 21 is a ring-shaped plate member. The front ring hole 21a opens in the center of the front ring plate 21. The front attaching member 20 has the hooking portion 22 protruding from the front ring hole 21a toward the backside of the seat. The hooking portion 22 has a tubular portion 22a and two folded portions 22b. The tubular portion 22a protrudes cylindrically from the periphery of the front ring hole 21a. The folded portions 22b are formed in a folded shape from a part of the protruding tip of the tubular portion 22a toward the outer side of the hole in the radial direction of the front ring hole 21a. Here, the hooking portion 22 corresponds to the "protruding portion" of the present disclosure.

As shown in FIGS. 3 and 7, the front ring plate 21 is assembled to fit into the inner circumference of the annular convex portion 15 of the covering member 10 from the frontside of the seat. By this assembly, the front ring plate 21 is abutted to the covering member 10 from the frontside of the seat so as to surround the connecting port 12. The front ring plate 21 is fixed to the covering member 10 by a double-sided tape 30. As shown in FIG. 8, the tubular portion 22a of the hooking portion 22 protrudes through the connecting port 12 to the backside of the seat. The folded portion 22b of the hooking portion 22 protrudes through the enlarging hole 13 to the backside of the seat. As shown in FIG. 9, the front attaching member 20 has a rotation regulating rib 23 that regulates movement of the front attaching member 20 in the rotational direction with respect to the covering member 10. Here, the front ring plate 21 corresponds to the "front abutting portion" of the present disclosure.

As shown in FIG. 8, the back attaching member 40 has a back ring plate 41, a plurality of blower attaching portions 42, and a back ring hole 41a. The back ring plate 41 is a ring-shaped plate member. The blower attachment portions 42 extend from the periphery of the back ring plate 41 to the backside of the seat. The back ring hole 41a opens in the center of the back ring plate 41. Each blower attaching portion 42 is configured to allow a rear case 52 of the blower case 50 to be assembled from the backside of the seat. The back attaching member 40 has two fitting portions 44 protruding inwardly in the radial direction of the hole from a portion of the periphery of the back ring hole 41a.

Figure 11:
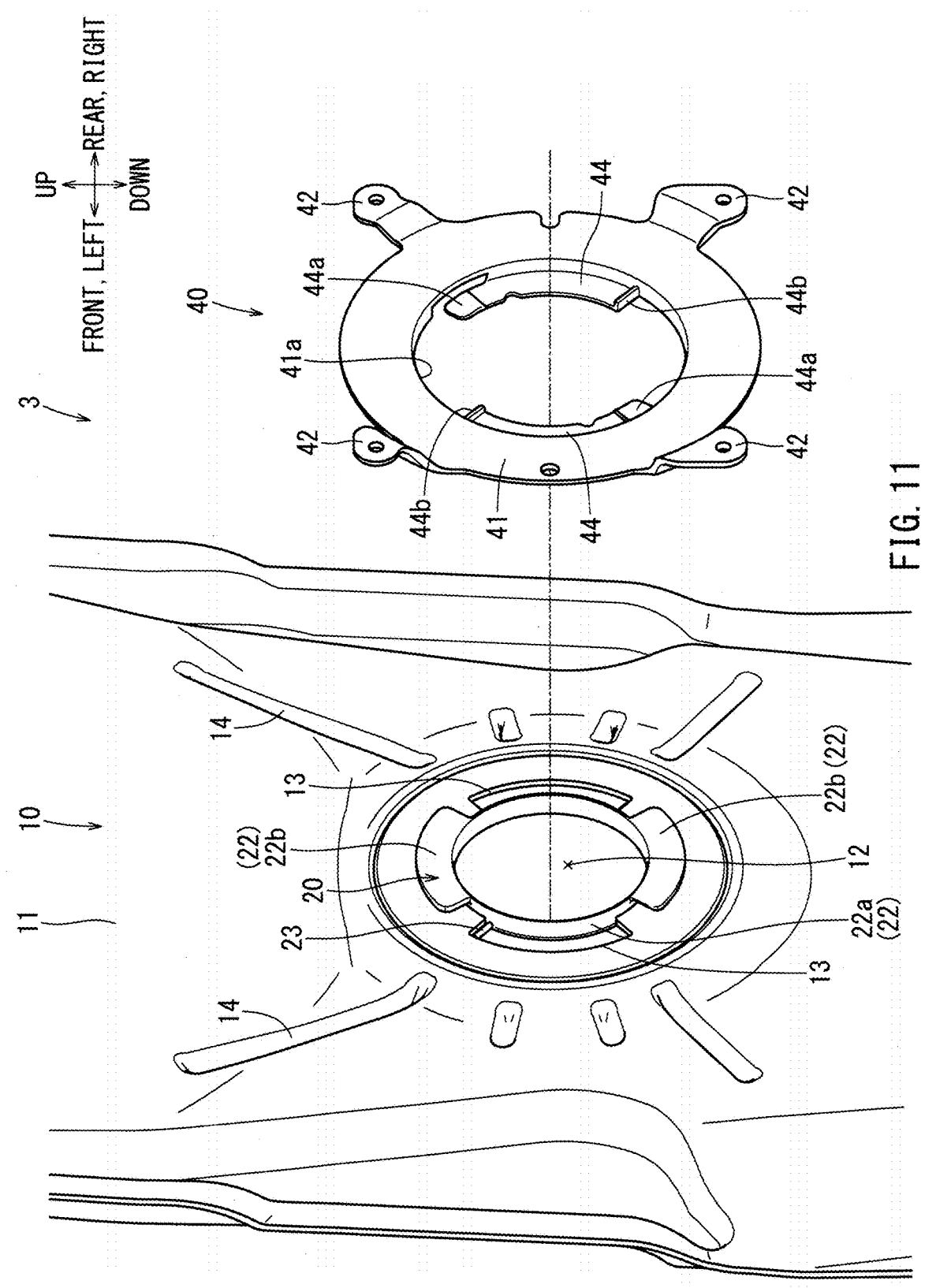
FIG. 11 is a perspective view showing the state in which a fitting portion and the hooking portion are displaced from each other in the direction of rotation.
Figure 12:
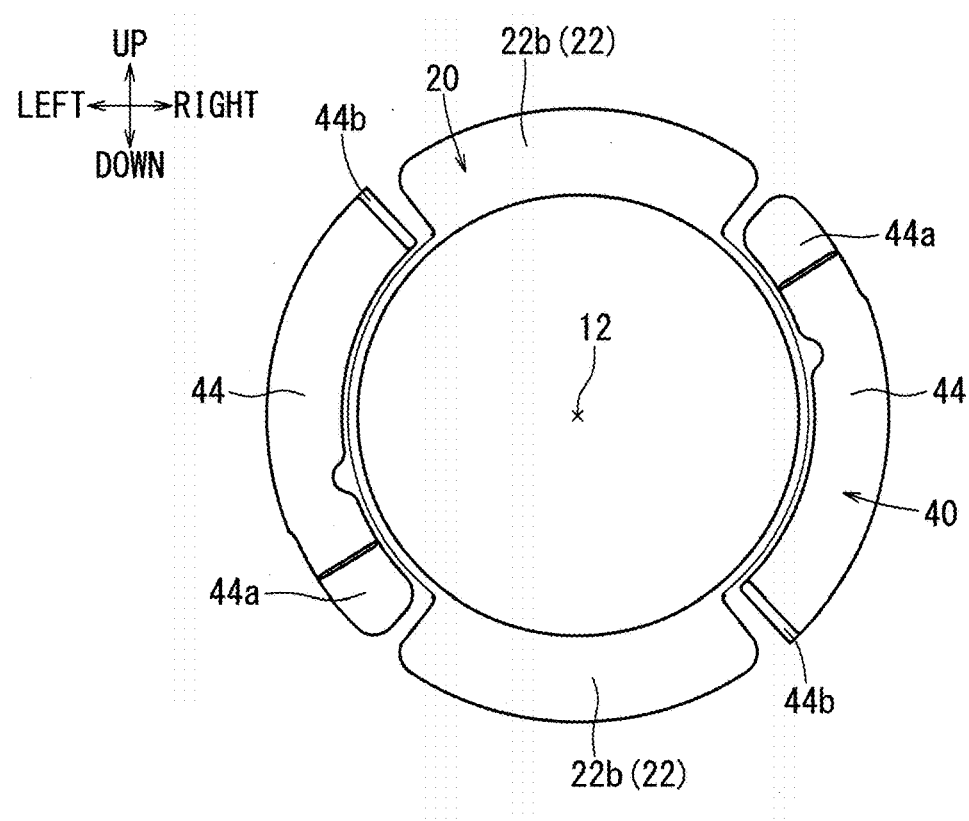
FIG. 12 is a schematic diagram showing the direction of rotation of the fitting portion from a rear view.
Figure 13:
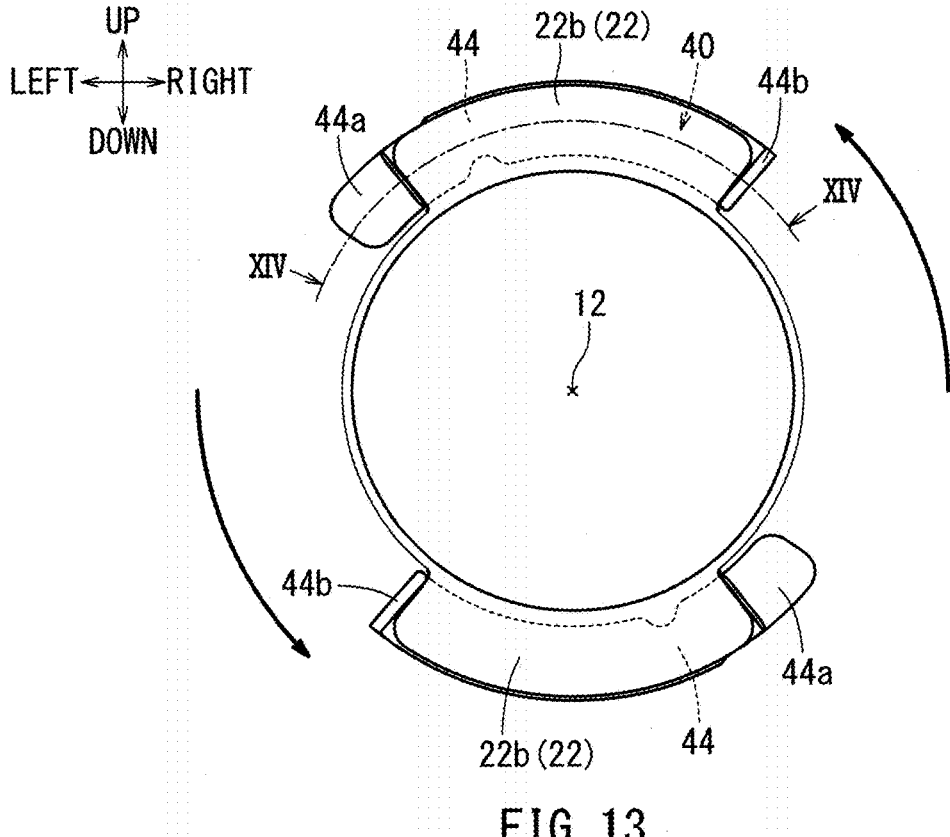
FIG. 13 is a schematic diagram showing the state in which the fitting portion is fitted into the hooking portion from the rear view.

As shown in FIGS. 11-13, each fitting portion 44 has the claw portion 44a and a rotation regulating portion 44b. The claw portion 44a and the folded portion 22b are snap-fitted together. The rotation regulating portion 44b regulates movement in the rotational direction. Each fitting portion 44 fits into each of the hooking portions 22 by rotating counterclockwise in the rear view. This fitting allows the back attaching member 40 to be attached to the front attaching member 20. As shown in FIG. 3, the back attaching member 40 has tubular ribs 43 protruding tubularly from around the back ring hole 41a toward the frontside of the seat. As shown in FIG. 7, the tubular rib 43 abuts against the covering member 10 from the backside of the seat when the back attaching member 40 is attached to the front attaching member 20. Here, the tubular rib 43 corresponds to the "back abutting portion" of the present disclosure.

The tubular rib 43 abuts on the covering member 10 from the backside of the seat so as to surround the connecting port 12. The covering member 10 is sandwiched between the tubular ribs 43 and the front ring plate 21. This allows the front attaching member 20 and the back attaching member 40 to be more properly secured to the covering member 10. Furthermore, the connecting port 12 can be properly sealed so that air passing through the connecting port 12 does not leak to outside. Here, the sandwiching structure of the covering member 10 by the front ring plate 21 and the tubular rib 43 corresponds to the "fixing portion" in the present disclosure.

As shown in FIG. 8, the blower case 50 has a front case 51 and a rear case 52. The front case 51 has an opening 51a in its center. The rear case 52 has a housing portion 52a, a first through hole 52b, and a second through hole 52c. The housing portion 52a is concave in a bottomed cylindrical shape toward the backside of the seat. The first through holes 52b are formed at four locations around the periphery of the rear case 52. The second through holes 52c are formed at four locations around the circumference of the housing portion 52a.

As shown in FIG. 9, the rear case 52 is assembled to the front case 51 from the backside of the seat. Specifically, the rear case 52 is attached by caulking the pins of the front case 51 through each second through holes 52c of the rear case 52 (i.e., a caulking portion 51b). The above assembly holds the blower housed in the housing portion 52a so that it does not fall out of the housing portion 52a. The rear case 52 is attached to the back attaching member 40 from the backside of the seat. Specifically, the rear case 52 is connected to each blower attaching portion 42 of the back attaching member 40 by passing vises (not shown) through each first through holes 52b from the backside of the seat. Thereby, the blower case 50 is attached to the back attaching member 40 from the backside of the seat.

The assembly procedure of each component of the air conditioning flow channel unit 3 described above will be explained in detail. First, the double-sided tape 30 shown in FIG. 2 is attached to the front ring plate 21 of the front attaching member 20 from the backside of the seat. The double-sided tape 30 is attached so that a cutout 31 is aligned with the rotation regulating rib 23 of the front attaching member 20. This prevents the double-sided tape 30 from lifting from the front ring plate 21 by the rotation regulation ribs 23. Next, as shown in FIG. 8, the front attaching member 20 is assembled to the covering member 10 from the frontside of the seat. Specifically, each hooking portion 22 of the front attaching member 20 is inserted into the connecting port 12 and each enlarging hole 13 of the covering member 10 from the frontside of the seat. Thereby, each of the hooking portions 22 protrudes through the covering member 10 to the backside of the seat.

Then, as shown in FIG. 9, the front attaching member 20 is rotated clockwise in the rear view. Thereby, each folded portion 22b is placed in a position displaced from each enlarging hole 13. Rotation of the front attaching member 20 is regulated by the rotation regulating rib 23 of the front attaching member 20 being engaged with the edge of the enlarging hole 13. After the above rotation, as shown in FIGS. 6 and 7, the front ring plate 21 is brought into surface contact with the covering member 10. As a result, the front ring plate 21 is fixed to the covering member 10 by the double-sided tape 30. In this way, the front attaching member 20 is assembled to the covering member 10 from the frontside of the seat.

As shown in FIG. 9, the back attaching member 40 and the blower case 50 are assembled to each other. The rear case 52 and the front case 51 are assembled to each other at the caulking portions 51b. Next, the rear case 52, assembled together with the front case 51, is attached to the blower attaching portions 42 of the back attaching member 40 by vises. As a result, the blower case 50 is assembled to the back attaching member 40 from the backside of the seat. Then, as shown in FIG. 10, the back attaching member 40 assembled with the blower case 50 is attached to the front attaching member 20 from the backside of the seat. Thereby, the blower case 50 is assembled to the covering member 10 via the front attaching member 20 and the back attaching member 40.

Figure 14:
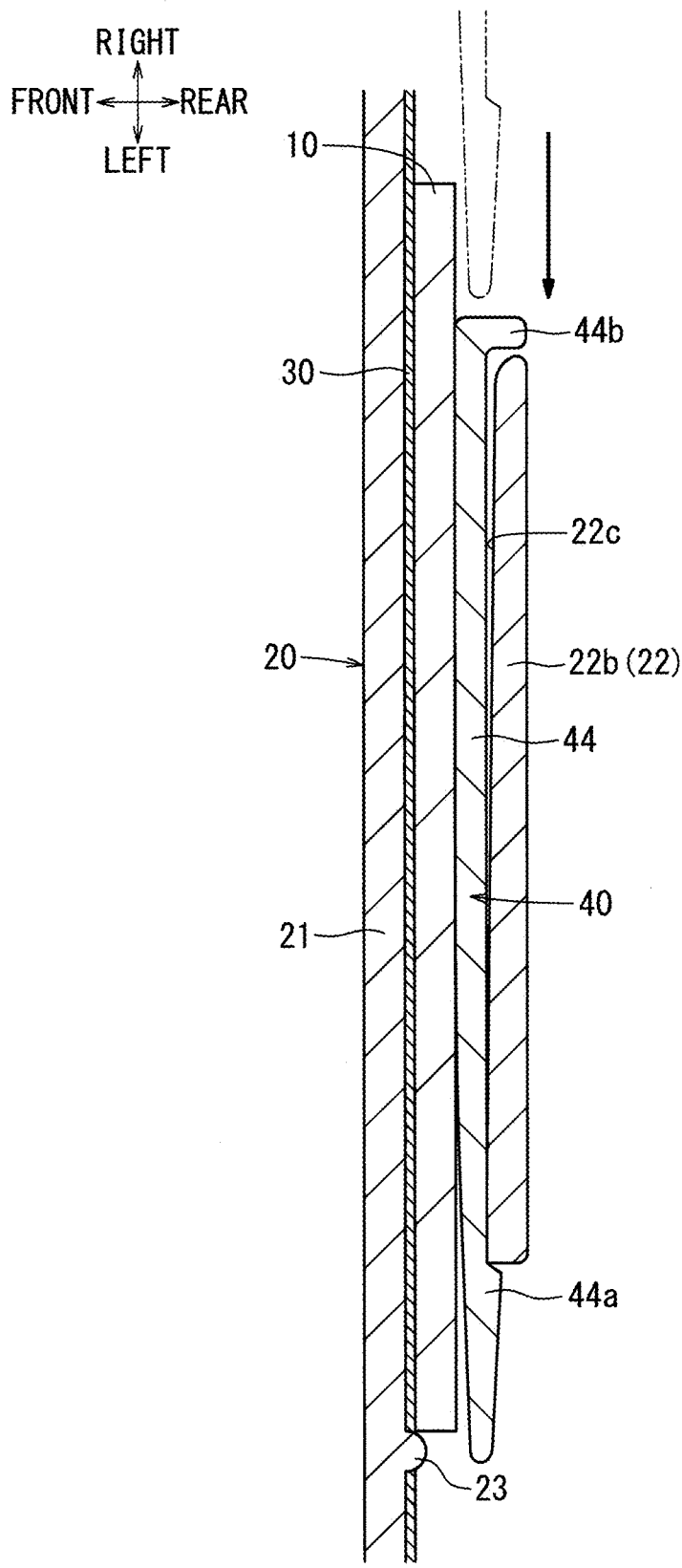
FIG. 14 is a cross-sectional view showing the state in which the fitting portion is fitted taken along a line XIV-XIV in FIG. 13.

Referring to FIGS. 11-13, the attachment of the back attaching member 40 to the front attaching member 20 will be described. First, the back attaching member 40 is pressed against the covering member 10 so that each fitting portion 44 passes through the gap between each hooking portions 22. Then, the back attaching member 40 is rotated counterclockwise in the rear view. Thereby, each fitting portion 44 is inserted between each of the hooking portions 22 and the covering member 10 and hooked to the folded portion 22b. In other words, as shown in FIG. 14, the claw portion 44a formed on the fitting portion 44 snap-fits into the folded portion 22b. Thereby, the fitting portion 44 is secured so that it does not come off from the folded portion 22b. In addition, the fitting portion 44 and the folded portion 22b are in contact with each other in the front-rear direction. As a result, the back attaching member 40 is attached to the front attaching member 20 so that it does not fall off toward the rear of the seat.

The folded portion 22b has a forcing surface 22c on the frontside of the seat in contact with the fitting portion 44. The forcing surface 22c is inclined. The forcing surface 22c forces the fitting portion 44 in a direction that gradually pushes the fitting portion 44 against the covering member 10 as the above-mentioned rotational movement progresses. As shown in FIG. 7, the above forcing causes the tubular rib 43 of the back attaching member 40 to be pressed further against the covering member 10. Accordingly, the folded portion 22b is also pushed back toward the rear of the seat by the fitting portion 44. Thereby, the front ring plate 21 of the front attaching member 20 is also further pressed against the covering member 10. The front ring plate 21 and the tubular rib 43 can more appropriately pinch the covering member 10. In this way, the back attaching member 40 is attached to the front attaching member 20. The air conditioning flow channel unit 3 is then assembled to the seat pad 2.

As shown in FIGS. 6 and 7, the covering member 10 is covered and adhered on the pad back surface 2c from the backside of the seat. The annular convex portion 15 of the covering member 10 is abutted against the pad back surface 2c. The front ring plate 21 is also abutted against the pad back surface so that the front ring plate 21 fits into a recessed portion 2h in the pad back surface 2c. Thereby, the air passing through the ventilation channel 2d and the connecting port 12 can be appropriately sealed to prevent leakage to outside.

As described above, the air conditioning flow channel unit for seat according to an embodiment has the following configuration. The reference numbers shown in parentheses are the numbers corresponding to the respective configurations shown in the above embodiment.

An air conditioning flow channel unit (3) for seat has a covering member (10), a front attaching member (20), a fixing portion, and a back attaching member (40). The covering member (10) is surface-shaped. The covering member (10) has a covering portion (11) and a connecting port (12). The covering portion (11) is placed over a seat pad (2) so as to form a channel wall of a concave ventilation channel (2d) formed in the seat pad (2). The connecting port (12) is formed in a part of the covering portion (11) to which a blower is connected from the backside of the seat. The front attaching member (20) has a front abutting portion (21) that is abutted on the covering member (10) from the frontside of the seat. The fixing portion fixes the front attaching member (20) to the covering member (10). The back attaching member (40) has a blower attaching portion (42) to which a blower is attached. The back attaching member (40) is provided on the backside of the seat of the covering member (10). One of the front attaching member (20) and the back attaching member (40) has a protruding portion (22). The protruding portion (22) protrudes through the connecting portion (12) toward the other. The other of the front attaching member (20) and the back attaching member (40) has a fitting portion (44). The fitting portion (44) is fitted to the protruding portion (22) by relative rotation around the connecting port (12) along the surface of the covering member (10). The back attaching member (40) is attached to the front attaching member (20) by fitting of the fitting portion (44).

According to the above configuration, the blower can be assembled to the covering member (10) provided with a connecting port (12) via the front attaching member (20) and the back attaching member (40). This prevents misalignment between the blower and the covering member (10).

The back attaching member (40) has a back abutting portion (43). The back abutting portion (43) abuts on the covering member (10) from the backside of the seat to sandwich the covering member (10). The fixing portion is a structure in which the covering member (10) is sandwiched between the front abutting portion (21) and the back abutting portion (43). According to the above configuration, the front attaching member (20) and the back attaching member (40) can be properly fixed to the covering member (10). This allows the blower to be more appropriately restrained from being misaligned with the covering member (10).

The protruding portion (22) may be a hooking portion (22). The hooking portion (22) protrudes from the front attaching member (20) through the connecting port (12) to the backside of the seat, and at the end of the protruding portion, the hooking portion (22) extends outward in the diameter direction of the connecting port (12) in a folded shape. The back attaching member (40) is fitted by snap-fitting the fitting portion (44) to the hooking portion (22) in a rotational direction. According to the above configuration, the fitting portion (44) is assembled to the hooking portion (22) by snap-fitting in a state that prevents the fitting portion (44) from coming off the hooking portion (22). In addition, the front attaching member (20) and the back attaching member (40) are assembled so that the front attaching member (20) and the back attaching member (40) do not fall off from the covering member (10) in the front-rear direction of the seat by abutting the fitting portion (44) and the hooking portion (22) in the front-rear direction of the seat due to the folding of the hooking portion (22).

The hooking portion (22), which is formed on the front attaching member (20), inserts through the connecting port (12) and the enlarging hole (13) so as to protrude toward the backside of the seat. Then, the hooking portion (22) is positioned away from the enlarging hole (13) by rotation of the front attaching member (20). As a result, the fitting portion (44) is fitted between the covering member (10) and the hooking portion (22) so as to be pressed between them. Therefore, the front attaching member (20) and the back attaching member (40) can be assembled to the covering member (10) without rattling.

The hooking portion (22) and/or the fitting portion (44) have a forcing surface (22c). The forcing surface (22) forces the fitting portion (44) in a direction that gradually pushes the covering portion (10) against the covering member (10) as the rotational movement of fitting the fitting portion (44) into the hooking portion (22) proceeds. According to the above configuration, the front attaching member (20) and the back attaching member (40) are pressed against the covering member (10) respectively as the rotational movement of the fitting portion (44) progresses. As a result, the front attaching member (20) and the back attaching member (40) are attached to the covering member (10) so that the covering member (10) is properly clamped. For example, if a forcing surface (22c) is provided with the hooking portion (22), the insertion opening of the hooking portion (22) into which the fitting portion (44) is inserted can be widened to facilitate insertion of the fitting portion (44). If the forcing surface (22c) is provided with the fitting portion (44), the tip of the fitting portion (44) in the direction of rotation can be made narrower to facilitate insertion of the fitting portion (44) into the insertion opening of the hooking portion (22).

The front abutting portion (21) and the back abutting portion (43) are abutted to the covering member (10) so as to surround the connecting port (12). According to the above configuration, the connecting port (12) can be properly sealed so that air passing through the connecting port (12) does not leak outside.

The front abutting portion (21) may be a front ring plate (21) that abuts in flat against the covering member (10) so as to surround the connecting port (12) of the covering member (10). The back abutting portion (43) may be a tubular rib (43) protruding cylindrically from the back attaching member (40) so as to surround the connecting port (12) of the covering member (10). According to the above configuration, the tubular ribs (43) sandwich the covering member (10) so that the tubular ribs (43) make a linear contact with the front ring plate (21). As a result, the front abutting portion (21) and the back abutting portion (43) can both properly pinch the covering member (10) and ensure sealing property of the front abutting portion (21) and the back abutting portion (43) to the covering member (10).

The present disclosure has been described above using an embodiment, but the present disclosure can be implemented in various other forms in addition to the above embodiment.

1. The covering member may be applied to a cushion pad as well as a back pad. For example, according to a seat pad 201 shown in FIG. 16, a covering member 210 has a covering portion 211. The covering portion 211 covers the seat surface along a groove formed on a pad surface 202b of a cushion pad 202. The covering portion 211 has a bottom surface 202e and a side surface 202f of a ventilation channel 202d. The covering member 210 has a connecting port 212 opening from a portion of the covering portion 211 to the backside of the seat. A blower is flow-connected to the connecting port 212 from the backside of the seat via the front attaching member 20 and the back attaching member 40. In this case, the covering member is covered on the seat pad from above.

2. The back attaching member may be configured without a back abutting portion that abuts on the covering member from the backside of the seat. For example, in an air conditioning flow channel unit 103 shown in FIG. 15, a front attaching member 120 has a front ring plate 121 and a hooking portion 122. The front ring plate 121 is abutted against a covering member 110 from the frontside of the seat. The hooking portion 122 protrudes to the backside of the seat through a connecting port 112. The hooking portion 122 has a fitting groove 122a to which a back attaching member 140 can be attached. The back attaching member 140 has a fitting portion 144 that is inserted into the fitting groove 122a from the backside of the seat and fitted by rotation around the connecting port 112. Thus, the back attaching member may be attached to the front attaching member without being abutted to the covering member from the backside of the seat. In the above configuration, the front attaching member 120 is desirably fixed to the fixed member by a fixing portion such as double-sided tape or adhesive.

3. The fixing portion is shown in the example as a sandwiched structure by the front abutting portion and the back abutting portion. However, instead of the sandwiched structure, adhesive tools such as double-sided tape and glue, or fastening tools such as bolts, nuts, and vises may be used for fixing.

4. The above embodiment shows a configuration in which the front abutting portion and the back abutting portion abuts against the covering member respectively, thereby clamping the covering member. However, the front abutting portion and the back abutting portion may be abutted against the covering member without clamping the covering member. For example, the tubular rib (the back abutting portion) may be abutted to a position that is radially outward from the front ring plate (the front abutting portion). Also, the front abutting portion and the back abutting portion may be abutted on a circumferentially displaced position each other. That is, the front abutting portion may be abutted on two places on the right and left sides of the connecting port from the frontside of the seat, and the back abutting portion may be abutted on two places on the upper and lower sides of the connecting port from the backside of the seat. The front abutting portion and the back abutting portion may be abutted on only a part of the connecting port without surrounding the connecting port. The front abutting portion and the back abutting portion may be respectively abutted on the covering member either by a surface contact or by a line contact.

Figure 15:
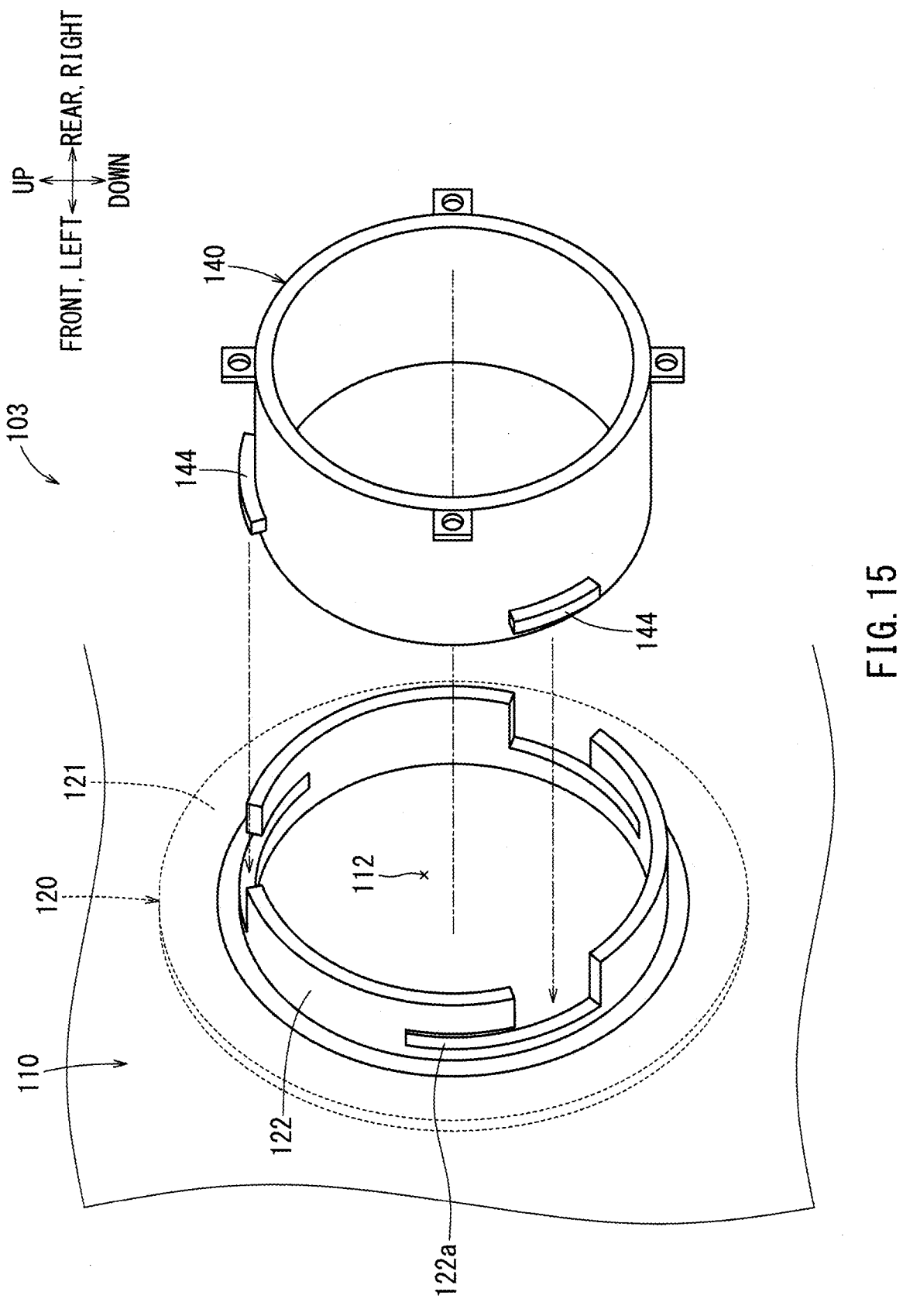
FIG. 15 is a perspective view of an air conditioning flow channel unit according to another embodiment.
Figure 16:
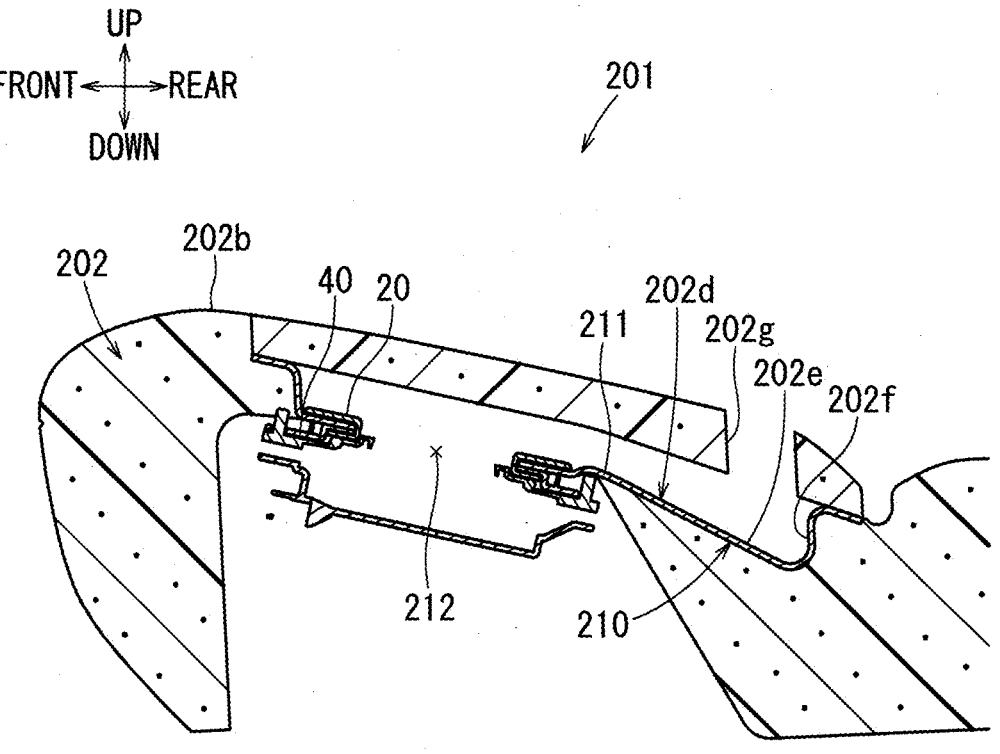
FIG. 16 is a cross-sectional view of an air conditioning flow channel unit according to another embodiment.

5. The protruding portion may be formed on the back attaching member and protrude toward the frontside of the seat via the connecting port. According to the rotational fitting of the protruding portion and the fitting portion in the above embodiment, the member equipped with the fitting portion rotates with respect to the member equipped with the protruding portion. However, the member equipped with the protruding portion may rotate with respect to the member equipped with the fitting portion. The two members may also be fitted by rotating each other. The hooking portion may extend in a folded shape toward the inside of the diameter direction of the connecting port. The hooking portion may be groove-shaped, for example, as shown in FIG. 15, or any shape other than the folded shape, as long as the fitting portion can be rotated and fitted. The folded portion may be positioned so that it overlaps with the enlarging hole.

6. The forcing surface may be formed on the surface in contact with the hooking portion of the fitting portion. In such a case, the fitting portion has a forcing surface whose width and diameter tapers from the base of the rotational movement to the tip. The forcing surface may also be formed on the surface of the fitting portion that is in contact with the covering member. Also in this case, the fitting portion has a forcing surface whose width and diameter tapers from the base of the rotational movement to the tip. The fitting portion may also be configured not to contact the covering member directly, as long as the fitting portion is forced toward a direction where it is gradually pressed against the covering member by the forcing surface as it rotates and moves.

According to another aspect, the back attaching member has a back abutting portion. The back abutting portion abuts on the covering member from the backside of the seat to sandwich the covering member. The fixing portion is a structure in which the covering member is sandwiched between the front abutting portion and the back abutting portion. The front attaching member and the back attaching member can be properly fixed to the covering member. This allows the blower to be more appropriately restrained from being misaligned with the covering member.

According to another aspect, the protruding portion is a hooking portion. The hooking portion protrudes from the front attaching member through the connecting port to the backside of the seat, and at the end of the protruding portion, the hooking portion extends outward in the diameter direction of the connecting port in a folded shape. The back attaching member is fitted by snap-fitting the fitting portion to the hooking portion in a rotational direction. According to the above configuration, the fitting portion is assembled to the hooking portion by snap-fitting in a state that prevents the fitting portion from coming off the hooking portion. In addition, the front attaching member and the back attaching member are assembled so that the front attaching member and the back attaching member do not fall off from the covering member in the front-rear direction of the seat by abutting the fitting portion and the hooking portion in the front-rear direction of the seat due to the folding of the hooking portion.

According to another aspect, the hooking portion, which is formed on the front attaching member, inserts through the connecting port and the enlarging hole so as to protrude toward the backside of the seat. Then, the hooking portion is positioned away from the enlarging hole by rotation of the front attaching member. As a result, the fitting portion is fitted between the covering member and the hooking portion so as to be pressed between them. Therefore, the front attaching member and the back attaching member can be assembled to the covering member without rattling.

According to another aspect, the hooking portion and/or the fitting portion have a forcing surface. The forcing surface forces the fitting portion in a direction that gradually pushes the covering portion against the covering member as the rotational movement of fitting the fitting portion into the hooking portion proceeds. According to the above configuration, the front attaching member and the back attaching member are pressed against the covering member respectively as the rotational movement of the fitting portion progresses. As a result, the front attaching member and the back attaching member are attached to the covering member so that the covering member is properly clamped. For example, if a forcing surface is provided with the hooking portion, the insertion opening of the hooking portion into which the fitting portion is inserted can be widened to facilitate insertion of the fitting portion. If the forcing surface is provided with the fitting portion, the tip of the fitting portion in the direction of rotation can be made narrower to facilitate insertion of the fitting portion into the insertion opening of the hooking portion.

According to another aspect, the front abutting portion and the back abutting portion are abutted to the covering member so as to surround the connecting port. According to the above configuration, the connecting port can be properly sealed so that air passing through the connecting port does not leak outside.

According to another aspect, the front abutting portion is a front ring plate that abuts in flat against the covering member so as to surround the connecting port of the covering member. The back abutting portion is a tubular rib protruding cylindrically from the back attaching member so as to surround the connecting port of the covering member. According to the above configuration, the tubular ribs sandwich the covering member so that the tubular ribs make a linear contact with the front ring plate. As a result, the front abutting portion and the back abutting portion can both properly pinch the covering member and ensure sealing property of the front abutting portion and the back abutting portion to the covering member.

The various examples described above in detail with reference to the attached drawings are intended to be representative of the present disclosure, and are thus non-limiting embodiments. The detailed description is intended to teach a person of skill in the art to make, use, and/or practice various aspects of the present teachings, and thus does not limit the scope of the disclosure in any manner. Furthermore, each of the additional features and teachings disclosed above may be applied and/or used separately or with other features and teachings in any combination thereof, to provide an improved air conditioning flow channel unit for seat, and/or methods of making and using the same.

What is claimed is:

1. An air conditioning flow channel unit for seat, comprising:
   a covering member;
   a front attaching member having a front abutting portion that is abutted on the covering member from the frontside of the seat;
   a fixing portion configured to fix the front attaching member to the covering member; and
   a back attaching member provided on the backside of the seat of the covering member,
   the covering member further comprises a covering portion that is placed over a seat pad to form a channel wall of a concave ventilation channel formed in the seat pad, and a connecting port that is formed in a part of the covering portion to which a blower is connected from the backside of the seat, the back attaching member has a blower attaching portion to which the blower is attached,
   wherein one of the front attaching member and the back attaching member has a protruding portion, the protruding portion protrudes through the connecting portion toward the other,
   wherein the other of the front attaching member and the back attaching member has a fitting portion being configured to fit the protruding portion by relatively rotating around the connecting port along the surface of the covering member, and
   wherein the back attaching member is attached to the front attaching member via the fitting portion.

2. The air conditioning flow channel unit for seat according to claim 1, wherein the back attaching member has a back abutting portion which abuts on the covering member from the backside of the seat to sandwich the covering member; and wherein the fixing portion is a structure in which the covering member is sandwiched between the front abutting portion and the back abutting portion.

3. The air conditioning flow channel unit for seat according to claim 1, wherein the protruding portion is a hooking portion that protrudes from the front attaching member through the connecting port to the backside of the seat, and at the end of the protruding portion, wherein the hooking portion extends outward in the diameter direction of the connecting port in a folded shape, and wherein the back attaching member is fitted by snap-fitting the fitting portion to the hooking portion in a rotational direction.

4. The air conditioning flow channel unit for seat according to claim 3, wherein the hooking portion formed on the front attaching member is inserted through the connecting port and the enlarging hole so as to protrude toward a backside of the seat, wherein the hooking portion is positioned away from the enlarging hole by rotation of the front attaching member, and wherein the fitting portion is configured to fit between the covering member and the hooking portion so as to be pressed between them.

5. The air conditioning flow channel unit for seat according to claim 3, wherein the hooking portion and the fitting portion have a forcing surface that is configured to force the fitting portion in a direction that gradually pushes the covering portion against the covering member as the rotational movement of fitting the fitting portion into the hooking portion proceeds.

6. The air conditioning flow channel unit for seat according to claim 2, wherein the front abutting portion and the back abutting portion are abutted to the covering member so as to surround the connecting port.

7. The air conditioning flow channel unit for seat according to claim 6, wherein the front abutting portion is a front ring plate that abuts in flat against the covering member so as to surround the connecting port of the covering member, and wherein the back abutting portion is a tubular rib protruding cylindrically from the back attaching member so as to surround the connecting port of the covering member.

8. The air conditioning flow channel unit for seat according to claim 1, wherein the front attaching member comprises a front ring plate being a ring-shaped plate member, and a front ring hole opening in a center of the front ring plate.

9. An air conditioning flow channel unit for seat, comprising:

a covering member;

a blower case attached to the covering member;

a front attaching member having a front abutting portion that is abutted on the covering member from the front side of the seat;

a fixing portion configured to fix the front attaching member to the covering member; and a back attaching member provided on the backside of the seat of the covering member, the covering member further comprises a covering portion that is placed over a seat pad to form a channel wall of a concave ventilation channel formed in the seat pad, and a connecting port that is formed in a part of the covering portion to which a blower is connected from the backside of the seat, the back attaching member has a blower attaching portion to which the blower is attached, wherein one of the front attaching member and the back attaching member has a protruding portion, the protruding portion protrudes through the connecting portion toward the other, wherein the other of the front attaching member and the back attaching member has a fitting portion that is fitted to the protruding portion by relatively rotating around the connecting port along the surface of the covering member, and wherein the back attaching member is attached to the front attaching member via the fitting portion.

10. The air conditioning flow channel unit for seat according to claim 9 further comprises a back pad having a pad body and a ventilation channel.

11. The air conditioning flow channel unit for seat according to claim 10, wherein the ventilation channel is concave-shaped extending along a pad back surface of the pad body.

12. The air conditioning flow channel unit for seat according to claim 10, wherein the back pad further comprises a plurality of ventilation holes, the plurality of ventilation holes penetrate from various locations on a bottom surface of the ventilation channel to a pad surface of the pad body.

13. The air conditioning flow channel unit for seat according to claim 9, wherein the back attaching member and the blower case are assembled integrally.

14. The air conditioning flow channel unit for seat according to claim 9, wherein the back attaching member and the blower case are attachable to the covering member via the front attaching member.

15. The air conditioning flow channel unit for seat according to claim 10, wherein the ventilation channel comprises a channel base, the channel base is formed at the center of the pad back surface in a height direction.

16. The air conditioning flow channel unit for seat according to claim 10, wherein the ventilation channel further comprises a plurality of channel tips, the plurality of channel tips is configured to extend from the channel base to branch off from each other in the height direction.

17. The air conditioning flow channel unit for seat according to claim 9, wherein the covering member further comprises:

a covering portion that is extends along the pad back surface;

a connecting port opening in a circular shape from a center of the covering portion; and an enlarging hole that is formed in an enlarged diameter from a portion of the connecting port.

18. The air conditioning flow channel unit for seat according to claim 9, wherein the covering member further comprises:

an annular convex portion protruding toward a front side of the seat to surround the connecting port; and a plurality of linear ribs projecting from a circumference of the annular convex portion.

* * * * *